(12) United States Patent
Zhang et al.

(10) Patent No.: US 8,750,150 B2
(45) Date of Patent: Jun. 10, 2014

(54) METHOD, APPARATUS AND SYSTEM FOR TRANSMITTING CHANNEL STATE INFORMATION

(75) Inventors: Gong Zhang, Shenzhen (CN); Yi Long, Bejing (CN); Cheng He, Shenzhen (CN); Yong Cheng, Shenzhen (CN); Kin Nang Lau, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 13/339,059

(22) Filed: Dec. 28, 2011

(65) Prior Publication Data

US 2012/0106384 A1 May 3, 2012

Related U.S. Application Data

(63) Continuation of application No. PCT/CN2010/076441, filed on Aug. 28, 2010.

(30) Foreign Application Priority Data

Aug. 28, 2009 (CN) .......................... 2009 1 0171411

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 12/28 | (2006.01) | |

(52) U.S. Cl.
USPC ............ 370/252; 370/253; 370/254; 370/255

(58) Field of Classification Search
None
See application file for complete search history.

(56) References Cited

U.S. PATENT DOCUMENTS

| | | | |
|---|---|---|---|
| 8,179,775 B2 * | 5/2012 | Chen et al. .................... 370/203 |
| 8,428,606 B1 * | 4/2013 | Vrzic et al. ................... 455/450 |
| 2008/0144562 A1 | 6/2008 | Draper et al. | |
| 2008/0192717 A1 | 8/2008 | Kent et al. | |

(Continued)

FOREIGN PATENT DOCUMENTS

| | | |
|---|---|---|
| CN | 101136178 A | 3/2008 |
| CN | 101136718 A | 3/2008 |
| CN | 101340222 A | 1/2009 |
| WO | WO 2008021062 A1 | 2/2008 |

OTHER PUBLICATIONS

Extended European Search Report issued in corresponding European Patent Application No. 10811295.4, mailed Feb. 27, 2012.

(Continued)

*Primary Examiner* — Hassan Phillips
*Assistant Examiner* — Lonnie Sweet
(74) *Attorney, Agent, or Firm* — Brinks Gilson & Lione

(57) ABSTRACT

An apparatus and a system for transmitting channel state information acquires channel state information of a channel between a mobile terminal and two or more cooperative base stations. The apparatus quantizes the channel state information separately by using a preset single-cell codebook used for quantizing the channel between the mobile terminal and each one of the two or more cooperative base stations. The apparatus acquires united codeword indexes of the quantized channel state information in the single-cell codebook; and transmits the united codeword indexes of the quantized channel state information in the single-cell codebook.

10 Claims, 5 Drawing Sheets

(56) References Cited

U.S. PATENT DOCUMENTS

| | | |
|---|---|---|
| 2008/0219366 A1 | 9/2008 | Lau et al. |
| 2008/0299981 A1 | 12/2008 | Foschini |
| 2009/0059819 A1 | 3/2009 | Choi et al. |
| 2010/0173659 A1* | 7/2010 | Shin et al. ............... 455/500 |

OTHER PUBLICATIONS

Office Action issued in corresponding European Patent Application No. 06705497.3, mailed Feb. 14, 2012.

Alcatel-Lucent, "Comparison of CSI Feedback Schemes" Agenda Item 15.2, 3GPP TSG-RAN WG1 #58. Shenzhen, China, Aug. 24-28, 2009. R1-093343.

Written Opinion of the International Searching Authority issued in corresponding PCT Patent Application No. PCT/CN2010/076441, mailed Dec. 9, 2010.

Communication issued in corresponding European Patent Application No. 10811295.4, mailed Oct. 15, 2012.

Chinese Patent No. 102006108, issued on Oct. 3, 2012, granted in corresponding Chinese Patent Application No. 200910171411.6.

International Search Report issued in corresponding PCT Patent Application No. PCT/CN2010/076441, mailed Dec. 9, 2010.

\* cited by examiner

METHOD, APPARATUS AND SYSTEM FOR TRANSMITTING CHANNEL STATE INFORMATION

CROSS-REFERENCE TO RELATED APPLICATIONS

This application is a continuation of International Application No. PCT/CN2010/076441, filed on Aug. 28, 2010, which claims priority to Chinese Patent Application No. 200910171411.6, filed on J Aug. 28, 2009, both of which are hereby incorporated by reference in their entireties.

BACKGROUND OF THE APPLICATION

1. Field of the Application

The present application relates to the field of communication, and especially to a method, an apparatus and a system for transmitting channel state information.

2. Description of the Related Art

In a Multiple-input Multiple-output (MIMO) system, it is necessary for a base station (BS) to acquire channel state information (CSI) from a mobile station (MS) and to perform communication according to the CSI information by using Space Division Multiple Access technology.

Because of limitation by the number of coded bits, it is difficult for the MS to transmit complete CSI information to the BS. In order to enable the BS to acquire the CSI information, a way of quantizing the complete CSI information is adopted at the MS so as to transmit limited CSI information to the BS. Specifically, in a single-cell MIMO system, a codebook for quantizing the CSI of a channel between the BS and MS is preset, and the MS uses the codebook to quantize the CSI information and then transmit the quantized CSI information to the BS.

During implementation of the embodiments described below, the inventor found that the number of cooperative BSs changes dynamically according to the change of the location of the MS in a cooperative MIMO system, and therefore it is impossible to set a codebook for quantizing the CSI information of the channel between the cooperative BSs and the MS in advance for the cooperative MIMO system. As a result, the MS cannot transmit the CSI information to the cooperative BSs.

SUMMARY OF THE APPLICATION

Embodiments of the present application provide a method, an apparatus and a system for transmitting channel state information, which are capable of transmitting channel state information in a cooperative MIMO system.

The embodiments adopt the following technical solutions:

A method of transmitting channel state information, comprising: acquiring channel state information between a mobile terminal and two or more cooperative base stations; quantizing the channel state information separately by using a preset single-cell codebook between the mobile terminal and each one of the two or more cooperative base stations, and acquiring united codeword indexes of the quantized channel state information in the single-cell codebooks; and transmitting the united codeword indexes of the quantized channel state information in the single-cell codebooks.

A method of transmitting channel state information, comprising: acquiring united codeword indexes of channel state information between a mobile terminal and two or more cooperative base stations in single-cell codebooks, wherein each of the single-cell codebooks is a single-cell codebook between the mobile terminal and one of the two or more cooperative base stations; and acquiring the channel state information between the mobile terminal and each of the two or more cooperative base stations by looking up codewords in the single-cell codebooks according to the united codeword indexes.

A mobile terminal comprising:

a first acquisition unit for acquiring channel state information between a mobile terminal and two or more cooperative base stations;

a second acquisition unit for quantizing the channel state information acquired by the first acquisition unit separately by using a preset single-cell codebook between the mobile terminal and each one of the two or more cooperative base stations, and acquiring united codeword indexes of the quantized channel state information in the single-cell codebook; and a transmission unit for transmitting the united codeword indexes of the quantized channel state information quantized by the second acquisition unit in the single-cell codebook.

A base station comprising:

a first acquisition unit for acquiring a united codeword indexes of channel state information between a mobile terminal and two or more cooperative base stations in single-cell codebooks, wherein each of the single-cell codebooks is a single-cell codebook between the mobile terminal and one of the two or more cooperative base stations; and a second acquisition unit for acquiring the channel state information between the mobile terminal and the two or more cooperative base stations by looking up codewords in the single-cell codebooks according to the united codeword indexes acquired by the first acquisition unit.

A communication system comprising:

a mobile terminal for acquiring channel state information between the mobile terminal and two or more cooperative base stations, quantizing the channel state information separately by using a preset single-cell codebook between the mobile terminal and each one of the two or more cooperative base stations, acquiring united codeword indexes of the quantized channel state information in the single-cell codebook, and transmitting the united codeword indexes to a cooperative base station; and a cooperative base station for receiving the united codeword indexes transmitted by the mobile terminal, and acquiring the channel state information by looking up codewords in the single-cell codebook according to the united codeword indexes.

The method, the apparatus and the system for transmitting channel state information provided by the embodiments are capable of quantizing the channel state information separately by using a preset single-cell codebook between the mobile terminal and each one of the two or more cooperative base stations and transmitting the united codeword indexes of the quantized channel state information in the single-cell codebook to the base station, and the base station is capable of acquiring the channel state information by looking up codewords in the single-cell codebook according to the united codeword indexes, and thereby the purpose of transmitting channel state information in the cooperative multiple-input multiple-output system is achieved and the problem existing in the prior art that the channel state information cannot be transmitted in the cooperative multiple-input multiple-output system due to the incapability of setting a codebook for the cooperative multiple-input multiple-output system caused by the change of the number of cooperative base stations is solved. Since the embodiments adopt single-cell codebooks to quantize the channel state information between the mobile terminal and two or more cooperative base stations respectively, the embodiments provide a technical solution with improved flexibility and extensibility.

DETAILED DESCRIPTION OF THE EMBODIMENTS

In order to solve the problem existing in the prior art that it is difficult to transmit CSI information in a cooperative MIMO system, the present invention provides a method, an apparatus and a system for transmitting channel state information.

Figure 1:
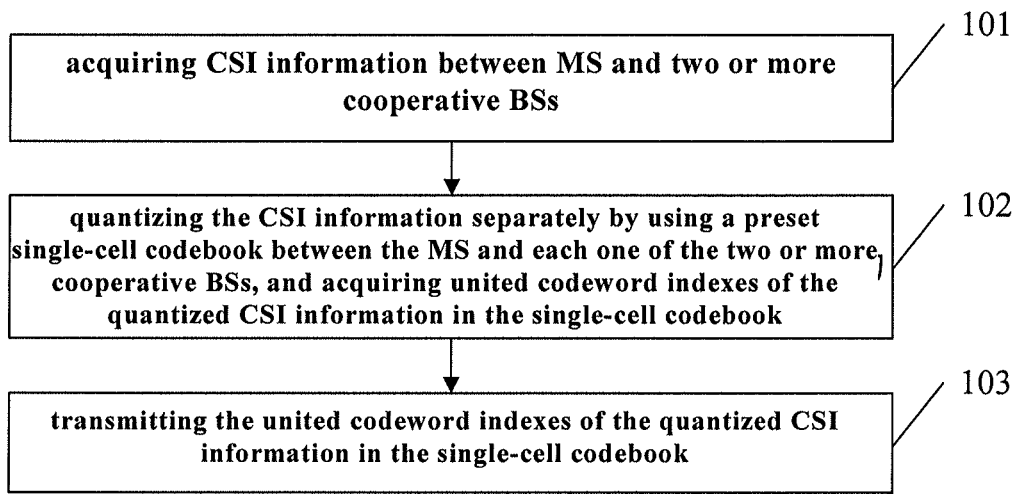
FIG. 1 is a flowchart of the method of transmitting channel state information provided by an embodiment.

As shown in FIG. 1, the method for transmitting channel state information as provided by an embodiment comprises:

Step 101 of acquiring CSI information between an MS and two or more cooperative BSs;

Step 102 of quantizing the CSI information acquired in Step 101 separately by using a preset single-cell codebook between the MS and each one of the two or more cooperative BSs, and acquiring united codeword indexes of the quantized CSI information in the single-cell codebook; and Step 103 of transmitting the united codeword indexes of the quantized CSI information in the single-cell codebook as acquired in the Step 102.

It is possible for the method of transmitting the channel state information according to the embodiment to quantize the CSI information separately by using a preset single-cell codebook between the MS and each one of the two or more cooperative BSs and transmit the united codeword indexes of the quantized CSI information in the single-cell codebook to the base station, thereby realizing the purpose of transmitting CSI information in the cooperative MIMO system and solving the problem existing in the prior art that the CSI information cannot be transmitted in the cooperative MIMO system due to the incapability of setting a codebook for the cooperative MIMO system caused by the change of the number of cooperative BSs. Since the embodiment adopts a single-cell codebook to quantize the CSI information between the MS and two or more cooperative BSs respectively, the embodiment provides a solution with improved flexibility and extensibility.

Figure 2:
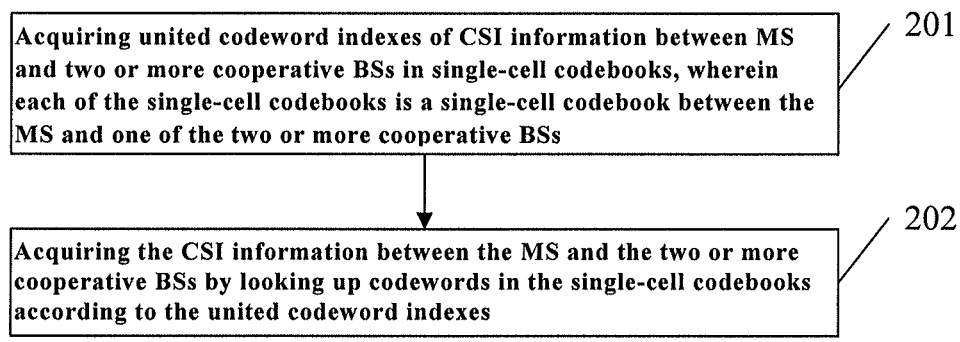
FIG. 2 is a flowchart of the method of transmitting channel state information provided by another embodiment.

As shown in FIG. 2, another embodiment further provides a method of transmitting channel state information which comprises:

Step 201 of acquiring united codeword indexes of CSI information between a MS and two or more cooperative BSs in single-cell codebooks each of which is a single-cell codebook between the MS and one of the two or more cooperative BSs; and Step 202 of acquiring the CSI information between the MS and the two or more cooperative BSs by looking up codewords in the single-cell codebooks according to the united codeword indexes acquired in the Step 201.

It is possible for the method of transmitting the channel state information according to the another embodiment to acquire the united codeword indexes of the CSI information between the MS and the two or more cooperative BSs in the single-cell codebooks and acquire the CSI information between the MS and the two or more cooperative BSs by looking up in the single-cell codebooks according to the united codeword indexes, thereby solving the problem existing in the prior art that a codebook cannot be set for the cooperative MIMO system due to the change of the number of cooperative BSs and achieving the purpose of transmitting the CSI information in the cooperative MIMO system.

To assist an ordinarily skilled person in the art in understanding the technical solution provided by the embodiment more clearly, detailed description of the method of transmitting the channel state information according to the embodiment will be given with respect to particular embodiments.

Figure 3:
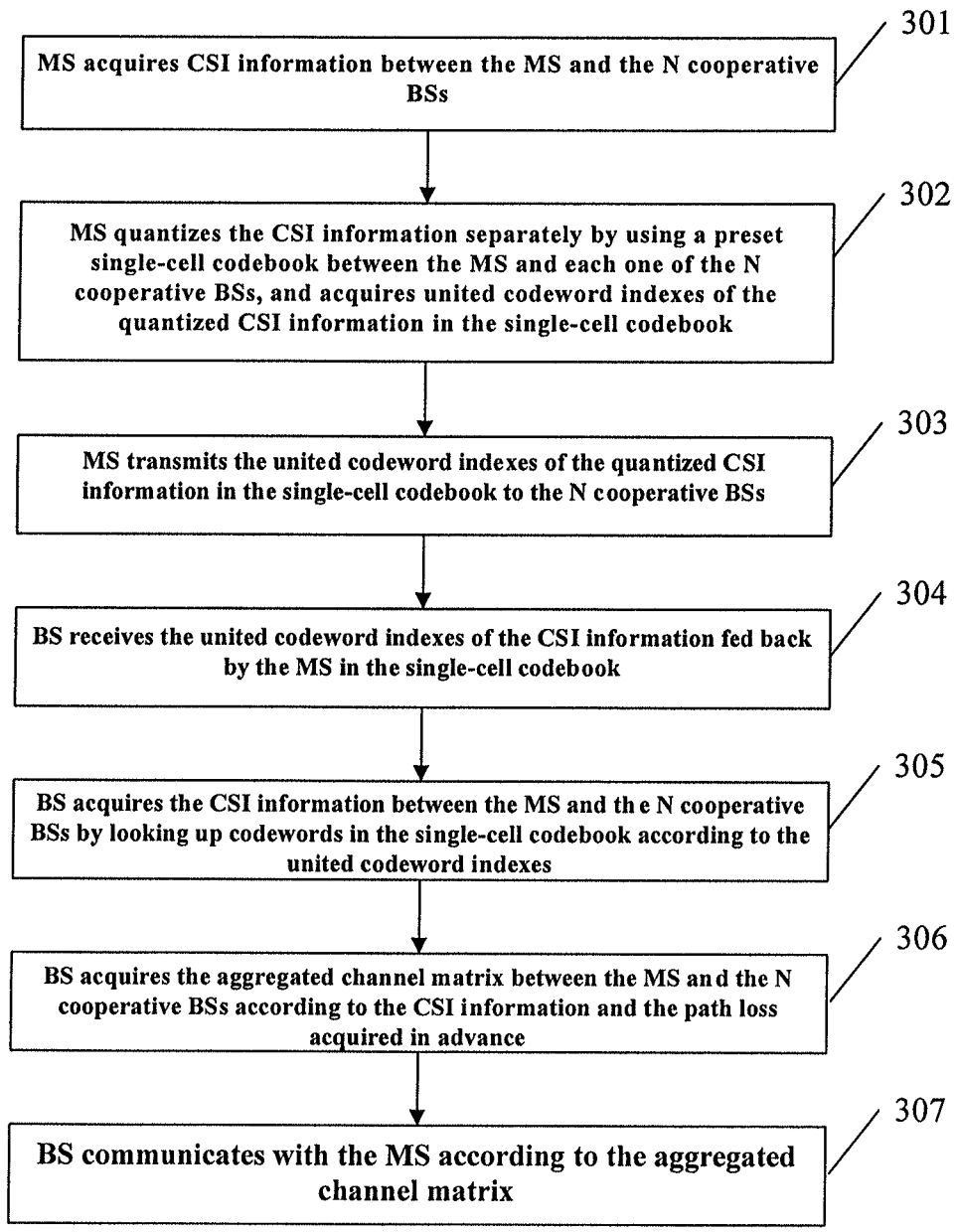
FIG. 3 is a flowchart of the method of transmitting channel state information provided by still another embodiment.

In a still another embodiment, the cooperative MIMO system includes N (N is an integer equal to or larger than 2) cooperative BSs which provide service to K (K is a natural number) MSs at the same time. When the k-th ($k \in [1,K]$) MS needs to feedback CSI information to the N cooperative BSs, as shown in FIG. 3, a method of transmitting channel state information according to the still another embodiment comprises:

Step 301 in which the MS acquires CSI information between the MS and the N cooperative BSs.

Figure 4:
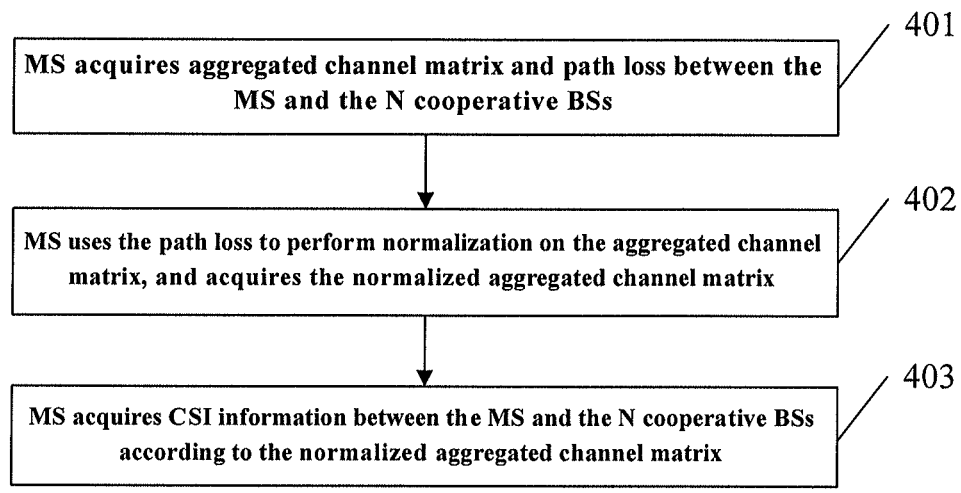
FIG. 4 is a flowchart of the Step 301 in the method of transmitting channel state information provided by the still another embodiment shown in FIG. 3.

As shown in FIG. 4, the step 301 may comprise the following steps.

In Step 401, the MS acquires an aggregated channel matrix $H_k$ and path loss $G_k$ between the MS and the N cooperative BSs.

In the present embodiment, the MS can receive the measurement information transmitted by the N cooperative BSs, estimate the channels between the MS and the N cooperative BSs according to the measurement information, and acquire the aggregated channel matrix $H_k = [H_{k,1}, H_{k,2}, \ldots, H_{k,N}]$ where $H_{k,n}$ is a channel matrix between the k-th MS and the n-th BS, with $H_{k,n} \in C^{n_R \times n_T}$, $n_R$ being the number of antennas of the k-th MS, $n_T$ being the number of antennas of the n-th BS, $n \in [1,N]$.

In a similar way, the MS can also detect path loss $G_k$ according to the measurement information transmitted by the N cooperative BSs, wherein $G_k$ is made up of path loss $g_{k,n}$ and Log normal shadowing effect $s_{k,n}$, $G_k \in R_+^{N_{n_T} \times N_{n_R}}$ is a diagonal matrix with the diagonal elements representing large-scale fading, $$G_k = \mathrm{diag}([\sqrt{g_{k,1}s_{k,1}}, \sqrt{g_{k,2}s_{k,2}}, \ldots, \sqrt{g_{k,N}s_{k,N}}]), n \in [1, N].$$

In Step 402, the MS uses the path loss $G_k$ to normalize the aggregated channel matrix $H_k$, and acquires the normalized aggregated channel matrix $H_k^{(\infty)} = H_k G_k^{-1}$.

In Step 403, the MS acquires CSI information between the MS and the N cooperative BSs according to the normalized aggregated channel matrix $H_k^{(\infty)}$, wherein the CSI information is specifically a base on row space of the normalized aggregated channel matrix $H_k^{(\omega)}$ between the MS and the N cooperative BSs.

In the present embodiment, MS can acquires the base on row space of the normalized aggregated channel matrix $H_k^{(\omega)}$ by performing singular value decomposition (SVD) on the normalized aggregated channel matrix $H_k^{(\omega)}$ according to following equation (1):

$$H_k^{(\omega)} = U_k^{(\omega)} S_k^{(\omega)} [V_k^{(\omega)}]^H = U_k^{(\omega)} S_k^{(\omega)} [O_{nR \times N_{nT-nR}}]$$
$$[V_k^{(\omega,1)} V_k^{(\omega,0)}]^+ = U_k^{(\omega)} S_k^{(\omega)} [V_k^{(\omega,1)}]^+ \quad (1)$$

where $V_k^{(\omega,1)}$ and $V_k^{(\omega,0)}$ are the orthogonal base (base on row space) and the null space of the normalized aggregated channel matrix $H_k^{(\omega)}$ respectively. For the sake of brevity, the orthogonal base $V_k^{(\omega,1)}$ of $H_k^{(\omega)}$ is simply denoted as $V_k^{(\omega)}$.

In Step 302, the MS quantizes the CSI information separately by using a preset single-cell codebook between the MS and each one of the N cooperative BSs, and acquires united codeword indexes of the quantized CSI information in the single-cell codebook.

The single-cell codebooks are $\phi_{k,1}, \phi_{k,2}, \ldots, \phi_{k,N}$, where $\phi_{k,n}(n \in [1,N])$ is a single-cell codebook between the k-th MS and the n-th BS, the size of the $\phi_{k,n}$ is $2^{B_{k,n}}$, and $$\sum_{n=1}^{N} B_{k,n} = B_k$$

with $B_k$ being the number of bits in which the MS feedbacks the CSI information. Furthermore, in the present embodiment, all the single-cell codebooks can be designed to have the same size.

The MS quantizes the CSI information by using the single-cell codebooks, and acquires the united codeword indexes of the quantized CSI information in the single-cell codebook. Specifically, a process is carried out as follows.

1. The MS quantizes the base on row space $V_k^{(\omega)}$ of the normalized aggregated channel matrix $H_k^{(\omega)}$ between the MS and the N cooperative BSs as acquired in the Step 301 respectively by using the codewords in the single-cell codebooks $\phi_{k,1}, \phi_{k,2}, \ldots, \phi_{k,N}$ corresponding to the N BSs.

2. The MS acquires the united codeword indexes of the quantized $H_k^{(\omega)}$ in the single-cell codebooks $\phi_{k,1}, \phi_{k,2}, \ldots \phi_{k,N}$ according to the following equation (2):

$$[J_{k,1}^*, J_{k,2}^*, \ldots, J_{k,N}^*] = \underset{[J_{k,1}, J_{k,2}, \ldots, J_{k,N}]}{\operatorname{argmin}} d_c(\overline{V}_k(J_{k,1}, J_{k,2}, \ldots, J_{k,N}), V_k^{(\omega)}) \quad (2)$$

where $$\overline{V}_k(J_{k,1}, J_{k,2}, \ldots, J_{k,N}) = \frac{1}{\sqrt{N}} [V_{J_{k,1}}^+ V_{J_{k,2}}^+ \ldots V_{J_{k,N}}^+]^+$$

with $V_{J_{k,n}}$ being the $J_{k,n}$-th codeword in the single-cell codebook $\phi_{k,n}$ between the k-th MS and the n-th BS; and $d_c(.)$ is the chordal distance between $\overline{V}_k(J_{k,1}, J_{k,2}, \ldots, J_{k,N})$ and $\tilde{V}_k^{(\omega)}$.

In Step 303, MS transmits the united codeword indexes of the quantized CSI information in the single-cell codebooks to the N cooperative BSs.

When a base station controller (BSC) is disposed separately, the MS transmits the united codeword index corresponding to each BS respectively to the BS, for example, the MS transmits the united codeword index $J_{k,1}^*$ corresponding to the first BS to the first BS, transmits the united codeword index $J_{k,2}^*$ corresponding to the second BS to the second BS, and similarly, transmits the united codeword index $J_{k,N}^*$ corresponding to the N-th BS to the N-th BS.

When a BSC is disposed on a certain BS, for example on the first BS, the MS transmits all the united codeword indexes $[J_{k,1}^*, J_{k,2}^*, \ldots, J_{k,N}^*]$ corresponding to the N cooperative BSs to that BS. The present embodiment is described by taking as an example a case where a BSC is disposed on a certain BS.

In Step 304, the BS receives the united codeword indexes of the CSI information fed back by the MS in the single-cell codebooks.

In the present embodiment, the BSC is disposed on the first BS which receives all the united codeword indexes $[J_{k,1}^*, J_{k,2}^*, \ldots, J_{k,N}^*]$ transmitted by the MS.

In step 305, the BS acquires the CSI information between the MS and the N cooperative BSs by looking up the codewords in the single-cell codebooks according to the united codeword indexes, wherein the CSI information is specifically the base on row space of the normalized aggregated channel matrix $H_k^{(\omega)}$ between the MS and the N cooperative BSs.

In the present embodiment, the BSs can acquire the row space $$\tilde{V}_k^{(\omega)} = \frac{1}{\sqrt{N}} [V_{J_{k,1}^*}^+, V_{J_{k,2}^*}^+, \ldots, V_{J_{k,N}^*}^+]^+$$

of the normalized aggregated channel matrix $H_k^{(\omega)}$ between the MS and the N cooperative BSs by looking up the single-cell codebooks $\phi_{k,1}, \phi_{k,2}, \ldots, \phi_{k,N}$ according to the united codeword indexes $[J_{k,1}^*, J_{k,2}^*, \ldots, J_{k,N}^*]$.

Optionally, after the BS acquires the CSI information, the BS can communicate with the MS according to the CSI information, as shown in FIG. 3, and the process can further comprise:

Step 306, in which the BS can acquire the aggregated channel matrix $\tilde{H}_k = [\tilde{V}_k^{(\omega)}]^+ G_k$ between the MS and the N cooperative BSs according to the CSI information $\tilde{V}_k^{(\omega)}$ and the path loss $G_k$ acquired in advance.

Step 307 in which the BS communicates with the MS according to the aggregated channel matrix, which comprises:

1. When the BS needs to communicate with the k-th MS, the BS acquires the aggregated channel matrix of the MSs other than the K-th MS $H = [\tilde{H}_1, \tilde{H}_2, \ldots, \tilde{H}_{k-1}, \tilde{H}_{k+1}, \ldots, \tilde{H}_k]^T$.

2. The BS performs singular value decomposition on the above described H to acquire the null space Null (H) for the MSs other than the k-th MS.

3. The BS obtains the coding matrix of the k-th MS according to the above described null space Null (H), encodes the information transmitted between the BS and the MS by using the coding matrix, and transmits the encoded information.

It is noted that in the present embodiment, when the BSC is disposed separately, the process further includes, after the Step 305, that the BS transmits the united codeword index of the CSI information fed back by the MS in the united codebook. Then in Step 306, the BSC acquires the CSI information between the MS and the N cooperative BSs by looking up the codewords in the united codebook according to the united codeword indexes, and transmits the CSI information to the BS.

It is possible for the method of transmitting channel state information according to this embodiment to quantize the CSI information between the MS and the N cooperative BSs separately by using a preset single-cell codebook between the MS and each one of the N cooperative BSs and transmit the united codeword indexes of the quantized CSI information in the single-cell codebook to the BS, and the BS acquires the channel sate information by looking up the single-cell codebook according to the united codeword indexes, thereby achieving the purpose of transmitting CSI information in the cooperative MIMO system. Since the CSI information is obtained by using the aggregated channel matrix quantized according to path loss, the technical solution according to the embodiment eliminates the influence by the path loss between the MS and different BSs on the transmission of the CSI information and solves the problem existing in the prior art that the CSI information cannot be transmitted in the cooperative MIMO system due to the incapability of setting a codebook for the cooperative MIMO system caused by the change of the number of cooperative BSs and the difference in path loss between the MS and different BSs. Since the embodiment uses the single-cell codebooks to quantize the CSI information between the MS and each of the N cooperative BSs respectively, the embodiment provides a technical solution with improved flexibility and extensibility.

Figure 5:
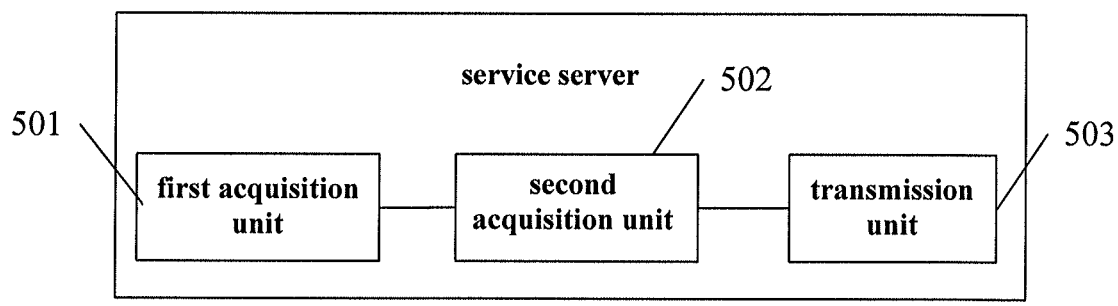
FIG. 5 is a schematic structural diagram of a mobile terminal provided by an embodiment.

As shown in FIG. 5, an embodiment further provides a mobile terminal which comprises:

a first acquisition unit 501 for acquiring channel state information between a mobile terminal and two or more cooperative base stations;

a second acquisition unit 502 for quantizing the channel state information acquired by the first acquisition unit 501 separately by using a preset single-cell codebook between the mobile terminal and each one of the two or more cooperative base stations, and acquiring united codeword indexes of the quantized channel state information in the single-cell codebook; and a transmission unit 503 for transmitting the united codeword indexes of the quantized channel state information acquired by the second acquisition unit 502 in the single-cell codebooks.

Figure 6:
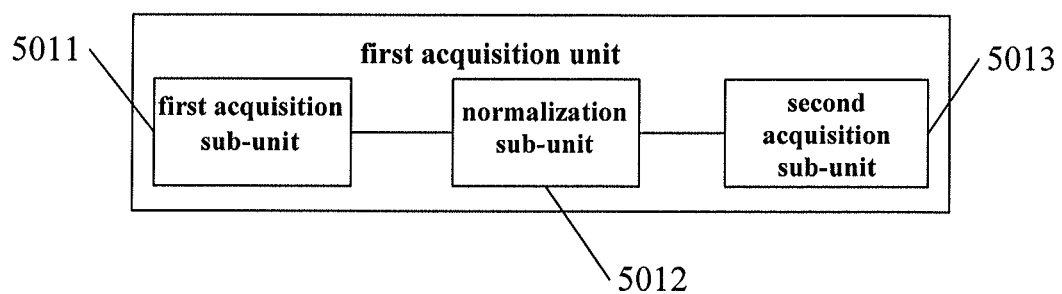
FIG. 6 is schematic structural diagram of the first acquisition unit in the mobile terminal provided by the embodiment shown in FIG. 5.

Furthermore, as shown in FIG. 6, the first acquisition unit 501 may comprise:

a first acquisition sub-unit 5011 for acquiring aggregated channel matrix and path loss between the mobile terminal and the two or more cooperative base stations;

a normalization sub-unit 5012 for acquiring a normalized aggregated channel matrix by performing normalization process on the aggregated channel matrix using the path loss acquired by the first acquisition sub-unit 5011; and a second acquisition sub-unit 5013 for acquiring the channel state information between the mobile terminal and the two or more cooperative base stations according to the normalized aggregated channel matrix acquired by the normalization sub-unit 5012.

For practice of the mobile terminal according to the embodiment, the description of the method of transmitting the channel state information provided by the embodiment can be referred to and redundant description will be omitted.

It is possible for the mobile terminal according to the embodiment to acquire the united codebook between the MS and the N cooperative BSs according to the preset single-cell codebook between the MS and individual BSs and quantize the CSI information by using the united codebook to transmit the united codeword indexes of the quantized CSI information in the united codebook to the BS, thereby achieving the purpose of transmitting CSI information in the cooperative MIMO system. Since the CSI information is obtained by using the aggregated channel matrix quantized using path loss, the technical solution according to the embodiment eliminates the influence by the path loss between the MS and different BSs on the transmission of the CSI information and solves the problem existing in the prior art that the CSI information cannot be transmitted in the cooperative MIMO system due to the incapability of setting a codebook for the cooperative MIMO system caused by the change of the number of cooperative BSs and the difference in path loss between the MS and different BSs. Since the embodiment uses the single-cell codebook to quantize the CSI information between the MS and each of the two or more cooperative BSs respectively, the embodiment provides a technical solution with improved flexibility and extensibility.

Figure 7:
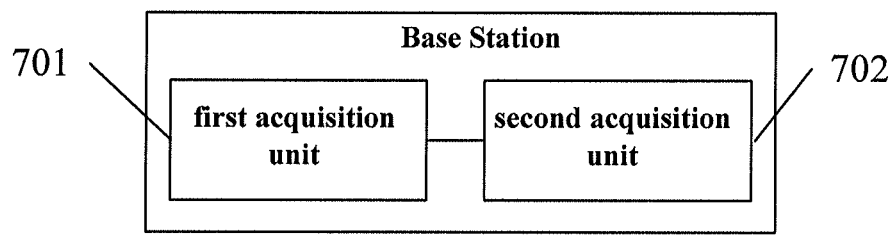
FIG. 7 is a first schematic structural diagram for a base station provided by an embodiment.

As shown in FIG. 7, an embodiment further provides a base station which comprises:

a first acquisition unit 701 for acquiring a united codeword index of channel state information between a mobile terminal and two or more cooperative base stations in single-cell codebooks, wherein each of the single-cell codebooks is a single-cell codebook between the mobile terminal and one of the two or more cooperative base stations; and a second acquisition unit 702 for acquiring the channel state information between the mobile terminal and the two or more cooperative base stations by looking up codewords in the single-cell codebook according to the united codeword indexes acquired by the first acquisition unit 701.

Figure 8:
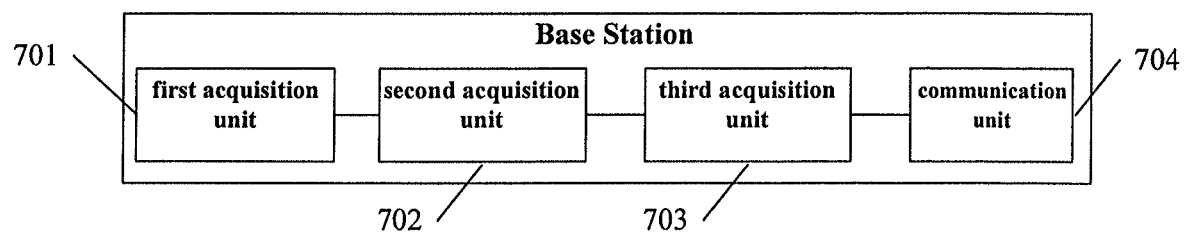
FIG. 8 is a second schematic structural diagram for the base station provided by an embodiment.

Furthermore, as shown in FIG. 8, the base station may further comprise:

a third acquisition unit 703 for acquiring an aggregated channel matrix $\tilde{H}_k = [\tilde{V}_k^{(\omega)}]^+ G_k$ between the mobile terminal and the two or more cooperative base stations according to the channel state information $\tilde{V}_k^{(\omega)}$ acquired by the second acquisition unit 702 and path loss $G_k$ acquired in advance; and a communication unit 704 for communicating with the mobile terminal according to the aggregated channel matrix acquired by the third acquisition unit 703.

For the specific implementation of the base station according to the embodiment, the description of the method of transmitting the channel state information according to the embodiment can be referred to and redundant description will be omitted.

It is possible for the base station according to the embodiment to acquire the united codeword index of the CSI information between the MS and the two or more cooperative BSs in the united codebook, and acquire the CSI information between the MS and the two or more cooperative BSs by looking up the united codebook according to the united codeword index. Since the united codebook is made up of single-cell codebooks, the problem existing in the prior art that a codebook cannot be set for the cooperative MIMO system due to the change of the number of cooperative BSs is solved, and the purpose of transmitting CSI information in the cooperative MIMO system is achieved.

Figure 9:
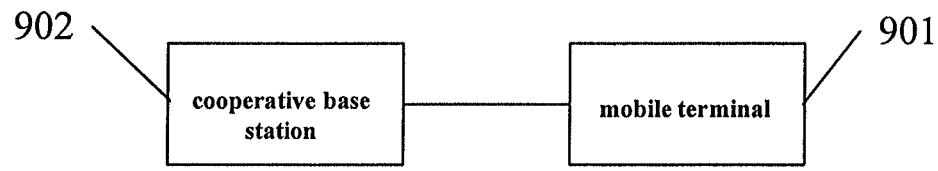
FIG. 9 is a first schematic structural diagram for a communication system provided by an embodiment.

As shown in FIG. 9, an embodiment further provides a communication system which comprises:

a mobile terminal 901 for acquiring channel state information between the mobile terminal and two or more cooperative base stations 902, quantizing the channel state information separately by using a preset single-cell codebook between the mobile terminal and one of the two or more cooperative base stations 902, acquiring united codeword indexes of the quantized channel state information in the single-cell codebook, and transmitting the united codeword indexes to a cooperative base station 902; and a cooperative base station 902 for receiving the united codeword index transmitted by the mobile terminal 901, and acquiring the channel state information by looking up codewords in the single-cell codebook according to the united codeword indexes.

For the specific implementation of the communication system according to the embodiment, the description of the method of transmitting the channel state information according to the embodiment can be referred to and redundant description will be omitted.

It is possible for the communication system according to the embodiment to quantize the channel state information separately by using a preset single-cell codebook between the mobile terminal and one of the two or more cooperative base stations and transmit the united codeword indexes of the quantized channel state information in the single-cell codebooks to the base station, and for the base station to acquire the channel state information by looking up the single-cell codebooks according to the united codeword indexes. Thereby, the purpose of transmitting channel state information in the cooperative multiple-input multiple-output system is achieved and the problem existing in the prior art that the channel state information cannot be transmitted in the cooperative multiple-input multiple-output system due to the incapability of setting a codebook for the cooperative multiple-input multiple-output system caused by the change of the number of cooperative base stations is solved. Since the embodiment adopts single-cell codebooks to quantize the channel state information between the mobile terminal and each of two or more cooperative base stations respectively, the embodiments provide a technical solution with improved flexibility and extensibility.

The method, the apparatus and the system of transmitting channel state information according to the embodiments are applicable to a cooperative MIMO system to perform transmission of CSI information in the cooperative MIMO system.

An ordinarily skilled person in the art can recognize that all or part of the steps in the method of the above described embodiments can be implemented with program instructions running on hardware. The program instructions can be stored in a computer readable storage medium, such as a ROM/RAM, a magnetic disc or an optical disc.

What is claimed is:

1. A method of transmitting channel state information comprising:
    acquiring channel state information of a channel between a mobile terminal and two or more cooperative base stations;
    quantizing the channel state information separately by using each single-cell codebook used to quantize the channel state information of the channel between the mobile terminal and each of the two or more cooperative base stations;
    acquiring united codeword indexes of the quantized channel state information in the single-cell codebook; and
    transmitting the united codeword indexes of the quantized channel state information in the single-cell codebook,
    wherein acquiring the channel state information of the channel between the mobile terminal and the two or more cooperative base stations comprises:
    acquiring an aggregated channel matrix and path loss between the mobile terminal and the two or more cooperative base stations;
    acquiring a normalized aggregated channel matrix by normalizing the aggregated channel matrix using the path loss; and
    acquiring the channel state information of the channel between the mobile terminal and the two or more cooperative base stations according to the normalized aggregated channel matrix.

2. The method according to claim 1, wherein the channel state information is a base on row space that is obtained by performing singular value decomposition on the normalized aggregated channel matrix, and
    wherein quantizing the channel state information further comprises quantizing the base on row space.

3. The method according to claim 1, wherein the united codeword indexes of the quantized channel state information in the united codebook are derived from the equation below:

$$[J^*_{k,1}, J^*_{k,2}, \ldots, J^*_{k,N}] = \operatorname*{argmin}_{[J_{k,1}, J_{k,2}, \ldots, J_{k,N}]} d_c(\overline{V}_k(J_{k,1}, J_{k,2}, \ldots, J_{k,N}), V_k^{(\omega)},$$

wherein $[J^*_{k,1}, J^*_{k,2}, \ldots, J^*_{k,N}]$ are the united codeword indexes, $V_k^{(\omega)}$ is the channel state information of the channel between the mobile terminal and the two or more cooperative base stations;

$$\overline{V}_k(J_{k,1}, J_{k,2}, \ldots, J_{k,N}) = \frac{1}{\sqrt{N}}[V^+_{J_{k,1}} V^+_{J_{k,2}} \cdots V^+_{J_{k,N}}]^+,$$

$V_{J_{k,n}}$ is the $J_{k,n}$-th codeword in the single-cell codebook used to quantized the channel state information of the channel between the mobile terminal and the n-th cooperative base station; and $d_c(.)$ is the chordal distance between $\overline{V}_k(J_{k,1}, J_{k,2}, \ldots, J_{k,N})$ and $\tilde{V}_k^{(\omega)}$.

4. A method of transmitting channel state information, comprising:
    acquiring, by a base station, united codeword indexes of channel state information of a channel between a mobile terminal and two or more cooperative base stations in single-cell codebooks, wherein each of the single-cell codebooks is a single-cell codebook used to quantize the channel state information of the channel between the mobile terminal and one of the two or more cooperative base stations; and
    acquiring, by the base station, the channel state information of the channel between the mobile terminal and the two or more cooperative base stations by looking up codewords in the single-cell codebooks according to the united codeword indexes; and
    acquiring, by the base station, an aggregated channel matrix $\tilde{H}_k = [\tilde{V}_k^{(\omega)}]^+ G_k$ of the channel between the mobile terminal and the two or more cooperative base stations according to the channel state information $\tilde{V}_k^{(\omega)}$ and path loss $G_k$ acquired in advance.

5. The method according to claim 4, further comprising:
    communicating with the mobile terminal according to the aggregated channel matrix.

6. The method according to claim 5, wherein communicating with the mobile terminal according to the aggregated channel matrix comprises:
    acquiring an aggregated channel matrix $H = [\tilde{H}_1, \tilde{H}_2, \ldots, \tilde{H}_{k-1}, \tilde{H}_{k+1}, \ldots, \tilde{H}_k]^T$ of the mobile terminals other than the k-th mobile terminal when a communication with the k-th mobile terminal is needed;

performing singular value decomposition on the H to acquire null space Null(H) for the mobile terminals other than the k-th mobile terminal;

obtaining a coding matrix for the k-th mobile terminal according to the null space Null(H);

coding information transmitted between the base station and the mobile station by using the coding matrix; and transmitting the coded information.

7. A mobile terminal comprising an antenna and a processor, the mobile terminal configured to:

acquire an aggregated channel matrix and path loss between a mobile terminal and two or more cooperative base stations;

acquire a normalized aggregated channel matrix by performing normalization process on the aggregated channel matrix using the path loss; and acquire channel state information of the channel between the mobile terminal and the two or more cooperative base stations according to the normalized aggregated channel matrix quantize the channel state information by using a single-cell codebook used for quantizing the channel state information of the channel between the mobile terminal and each one of the two or more cooperative base stations, and acquiring united codeword indexes of the quantized channel state information in the single-cell codebook; and transmit the united codeword indexes of the quantized channel state information in the single-cell codebook.

8. A base station comprising an antenna, a processor and a non-transitory storage medium, the base station configured to:

acquire united codeword indexes of channel state information of a channel between a mobile terminal and two or more cooperative base stations in single-cell codebooks, wherein each of the single-cell codebooks is a single-cell codebook used to quantized the channel state information of the channel between the mobile terminal and one of the two or more cooperative base stations;

acquire the channel state information of the channel between the mobile terminal and the two or more cooperative base stations by looking up codewords in the single-cell codebooks according to the united codeword indexes acquired by the first acquisition unit; and acquire an aggregated channel matrix $\tilde{H}_k = [\tilde{V}_k^{(\omega)}]^+ G_k$ of the channel between the mobile terminal and the two or more cooperative base stations according to the channel state information $\tilde{V}_k^{(\omega)}$ and path loss $G_k$ acquired in advance.

9. The base station according to claim 8, further configured to:

communicate with the mobile terminal according to the aggregated channel matrix acquired by the third acquisition unit.

10. A communication system comprising:

a mobile terminal configured to for acquire channel state information of a channel between the mobile terminal and two or more cooperative base stations, quantize the channel state information separately by using a single-cell codebook used for quantizing the channel state information of the channel between the mobile terminal and each one of the two or more cooperative base stations, acquire united codeword indexes of the quantized channel state information in the single-cell codebook, and transmitting the united codeword indexes to a cooperative base station; and a cooperative base station configured to receive the united codeword indexes transmitted by the mobile terminal, and acquire the channel state information by looking up codewords in the single-cell codebook according to the united codeword indexes, wherein the cooperative base station is configured to acquire an aggregated channel matrix $\tilde{H}_k = [\tilde{V}_k^{(\omega)}]^+ G_k$ of the channel between the mobile terminal and the cooperative base stations according to the channel state information $\tilde{V}_k^{(\omega)}$ and path loss $G_k$ acquired in advance.

* * * * *